(12) United States Patent
Weinhold

(10) Patent No.: US 7,434,851 B2
(45) Date of Patent: Oct. 14, 2008

(54) DEVICE FOR THE CONNECTION OF HIGH-PRESSURE CONDUIT PIPES

(76) Inventor: Karl Weinhold, Im Jagdfeld 42, Neuss (DE) 41464

( * ) Notice: Subject to any disclaimer, the term of this patent is extended or adjusted under 35 U.S.C. 154(b) by 0 days.

(21) Appl. No.: 11/115,073

(22) Filed: Apr. 26, 2005

(65) Prior Publication Data

US 2006/0273589 A1 Dec. 7, 2006

(51) Int. Cl.
*F16L 23/00* (2006.01)
(52) U.S. Cl. .................... 285/413; 285/409; 285/414; 285/24
(58) Field of Classification Search ................ 285/409, 285/413, 414, 415, 386, 397, 242, 370, 24; 248/58, 62
See application file for complete search history.

(56) References Cited

U.S. PATENT DOCUMENTS

| | | | | |
|---|---|---|---|---|
| 599,267 A | * | 2/1898 | Smith | 285/353 |
| 643,200 A | * | 2/1900 | Rankert | 285/337 |
| 658,863 A | * | 10/1900 | Pfeffer | 285/337 |
| 1,813,528 A | * | 7/1931 | Clark | 285/61 |
| RE22,810 E | * | 11/1946 | Miller | 285/386 |
| 2,698,760 A | * | 1/1955 | Roth et al. | 285/63 |
| 2,738,993 A | * | 3/1956 | Wilson | 285/235 |
| 2,774,616 A | * | 12/1956 | Dodd et al. | 285/33 |
| 2,872,141 A | * | 2/1959 | Hefner | 248/62 |
| 3,312,434 A | * | 4/1967 | Simon | 248/62 |
| 3,821,670 A | * | 6/1974 | Thompson | 333/255 |
| 3,937,501 A | * | 2/1976 | Weinhold | 285/365 |
| 4,008,937 A | * | 2/1977 | Filippi | 439/192 |
| 4,274,765 A | | 6/1981 | Spence et al. | |
| 4,319,125 A | * | 3/1982 | Prince | 126/92 B |
| 4,480,861 A | * | 11/1984 | Cann, Jr. | 285/334.2 |
| 4,890,866 A | * | 1/1990 | Arp | 285/243 |
| 5,460,415 A | * | 10/1995 | Lengauer et al. | 285/61 |
| 6,921,115 B2 | * | 7/2005 | Gill | 285/365 |

FOREIGN PATENT DOCUMENTS

DE 197 13 202 C1 6/1998

* cited by examiner

*Primary Examiner*—David E Bochna
(74) *Attorney, Agent, or Firm*—The Webb Law Firm

(57) ABSTRACT

A device is illustrated and described for connecting two ends of high-pressure pipelines for use in longwalls of underground mining, having a removable pipe coupling for tension-proof and tight connection of the two pipe ends whose constructions are tailored to one another. In order to counteract the catching as the pipeline is displaced in the longitudinal direction, so that damage or even destruction of the pipeline or pipe connections may be reliably prevented, each pipe end is reinforced using an essentially conical ring, whose outer surface expands from the external diameter of the pipe up to the external diameter of the pipe coupling.

16 Claims, 4 Drawing Sheets

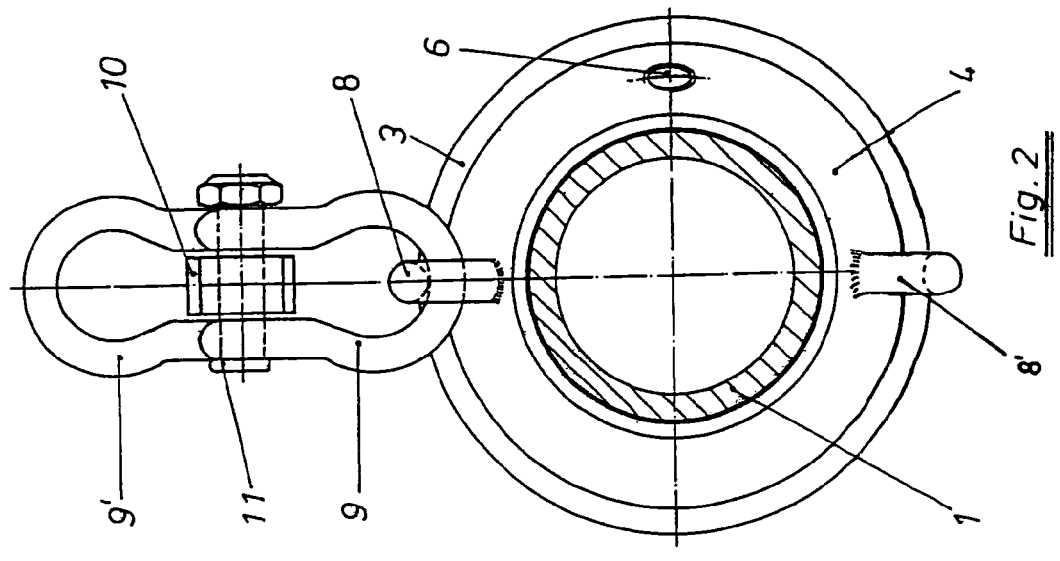
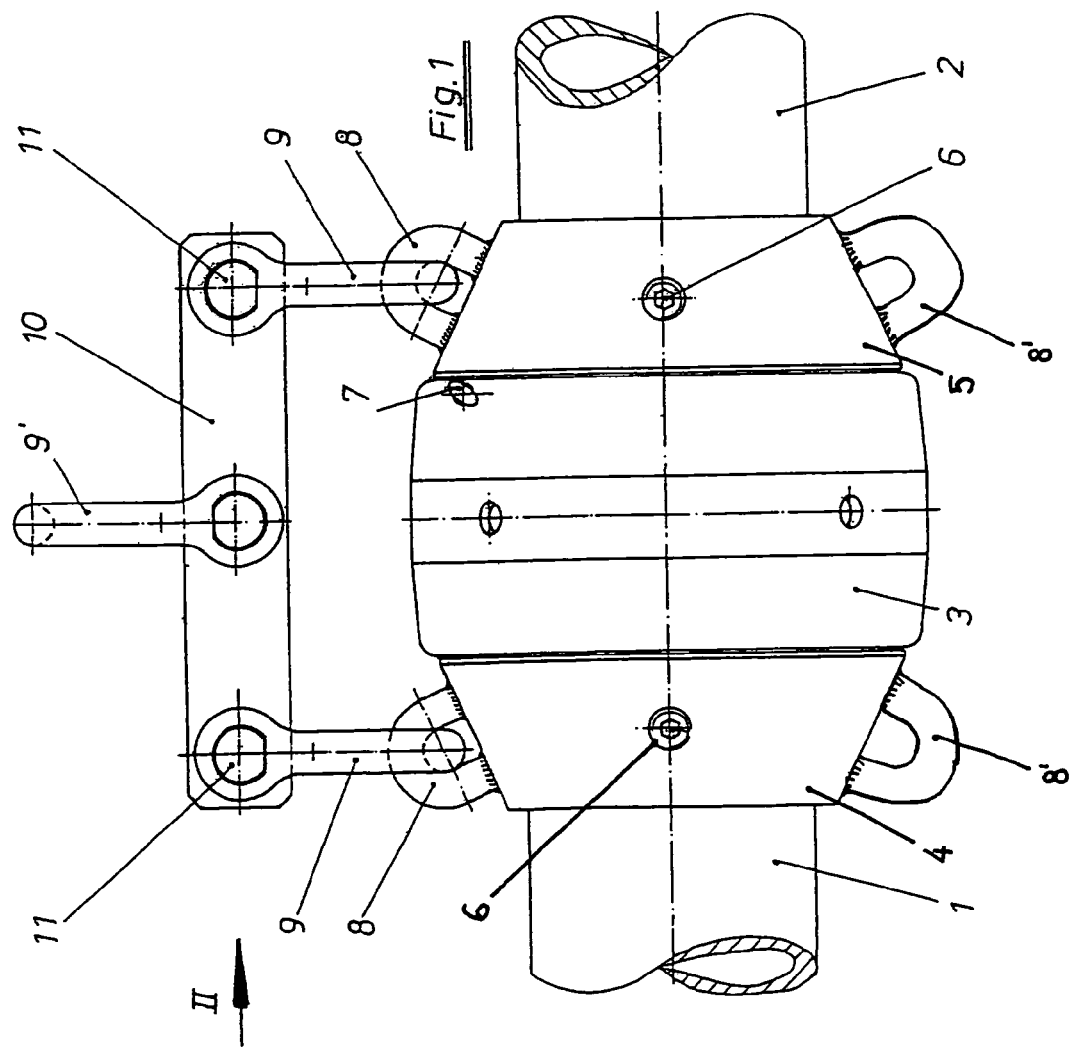

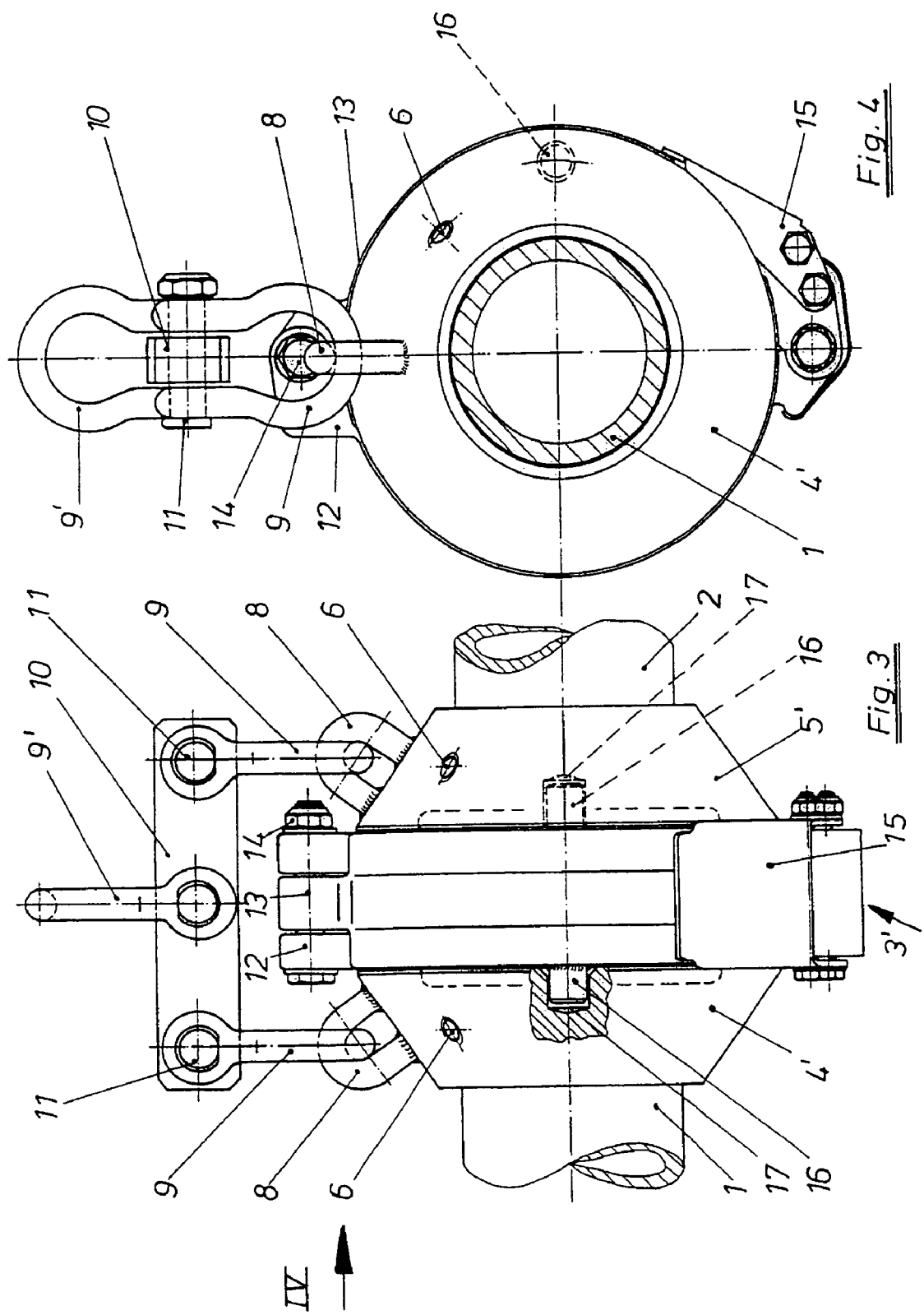

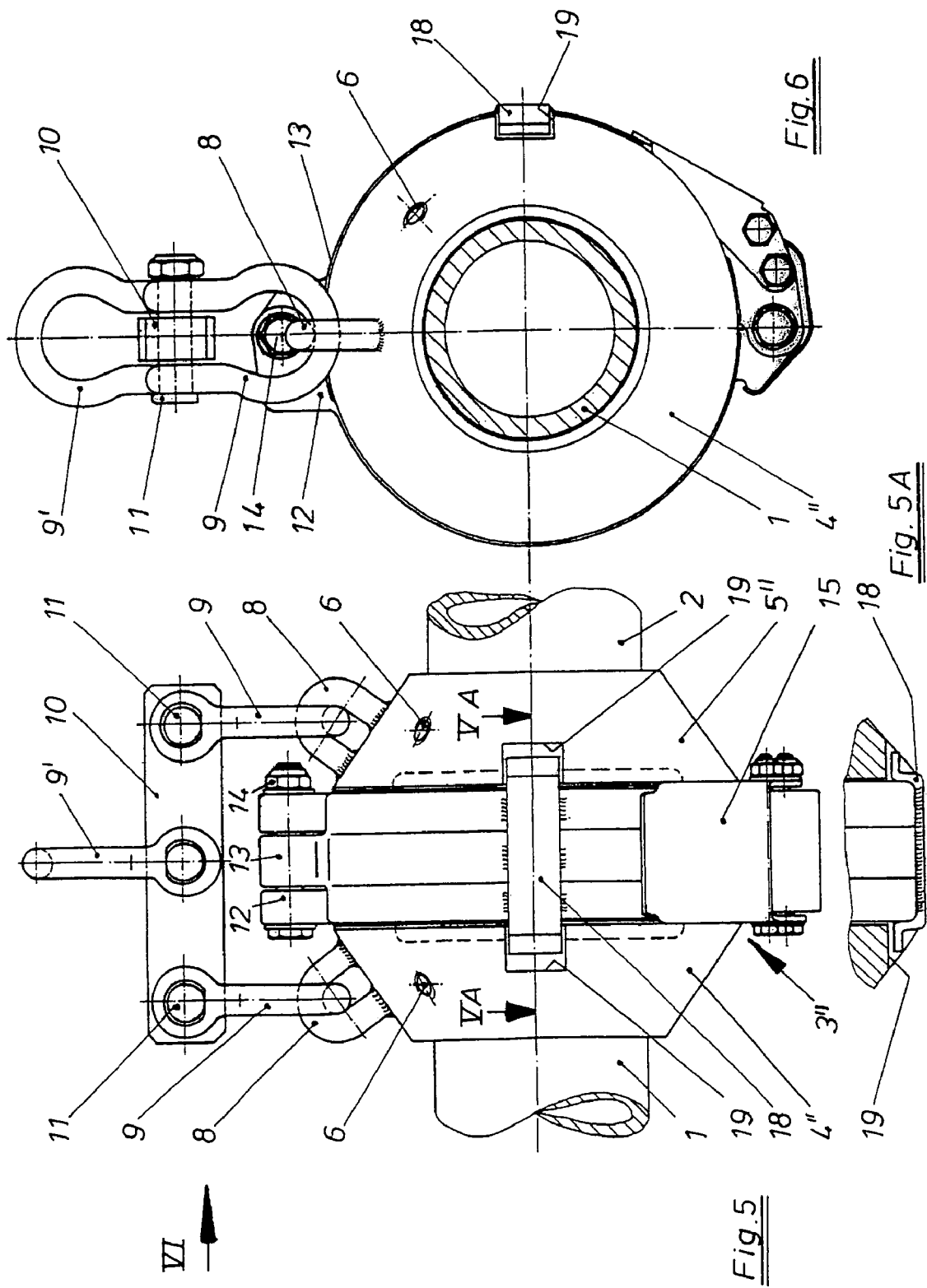

DEVICE FOR THE CONNECTION OF HIGH-PRESSURE CONDUIT PIPES

BACKGROUND OF THE INVENTION

1. Field of the Invention

The present invention relates to a device for connecting two ends of high-pressure pipelines for use in longwalls of underground mining, having a removable pipe coupling for tension-proof and tight connection of the two pipe ends, whose constructions are tailored to one another.

High-pressure pipelines are used in underground mining in greatly varying embodiments. For stationary laying of such lines in underground passages, the pipes are usually suspended using typical chains on the structure located in the passages. The mechanical loads of such pipelines and their connections are therefore relatively low.

2. Description of Related Art

A device according to the species is known from DE 197 13 202 C1, from the applicant of the present application. A pipe coupling having a screw connection is described therein, which may still be opened easily even after longer intervals and is resistant to the strong atmospheric contamination underground.

In addition, however, there are also regions in underground mining in which high-pressure pipelines must be laid which are subjected to extreme mechanical strains. This particularly applies for use in a longwall. Such longwall lines are attached directly to the bracket of a conveyor, in that the line is suspended below the cable channel for the electrical supply line of disk shearers. Such pipelines are used for the hydraulic supply of the shield-type support in the longwall. The shield-type support is hydraulically controlled in this case and forms a buttress with the conveyor, so that when the shield is tensioned, a region of the conveyor is pressed in the direction of the working face (coal seam) and for retraction, the somewhat reeled-in shields are pulled to the conveyors tensioned by the neighboring shields.

In accordance with the mining of coal, the conveyor runs "snake-like" in the longitudinal direction of the longwall, so that the pipelines mounted on the bracket are subjected to significant bending forces. As individual shields advance, angles arise, which must be absorbed in the elastic range of pipelines. In addition to the bending forces, the pipelines are subjected to changes in length, which may result in the pipeline catching or getting stuck on projecting parts at the connection points of the individual shields. Damage may be caused in this case, which may destroy the pipe connections, the pipeline, or bracket parts.

The above-mentioned loads may not be avoided, however, since the movement of the conveyor is intrinsic to longwall mining, so that the pipe connections present every 2 or 4 m, depending on the pipe length, are pressed against the bracket as they are pushed along and the angling is initiated forcefully. The load must therefore be absorbed by the pipeline and particularly its connection parts.

SUMMARY OF THE INVENTION

On the basis of this, the present invention is based on the object of designing and refining the device for connecting two pipe ends cited at the beginning and described in greater detail above in such a way that the catching during the displacement of the pipeline in the longitudinal direction is counteracted, in order to reliably prevent damage or even destruction of the pipeline or pipe connections. Furthermore, it is desirable for the suspension of the pipelines to also be selected so that it withstands the axial displacements occurring.

This object is achieved in a device for connecting two ends of high-pressure pipelines for use in underground mining in that each pipe end is reinforced with an essentially conical ring whose external surface expands from the external diameter of the pipe up to the external diameter of the pipe coupling.

Therefore, according to the present invention, the pipe coupling is protected by stiffening on both sides through the use of conical rings. According to a further teaching of the present invention, the conical rings are pushed onto the pipes before the welding of the pipe coupling parts and are pushed axially up to the pipe coupling and fixed there after the pipe coupling has been mounted. The conical rings are preferably fixed with the pipe ends using embedded screws.

In order to ensure an especially expedient suspension of the pipeline provided with the device according to the present invention, according to a further implementation of the present invention, each conical ring has at least one radially projecting eye for the purpose of suspension. It has particularly proven itself here for a centrally suspended clip to be provided for the suspension, on whose ends rotatable shackles are positioned, which are mounted in the eyes of the conical rings. The spacing of the two shackles located on the clip is expediently essentially precisely as large as the spacing of the eyes located underneath them. In addition, it is possible to provide even further eyes on the conical rings. In this way, for example, the upper eyes may be used for suspending the pipeline and a further line may be attached to the lower eyes, for example.

The device according to the present invention is suitable for greatly varying pipe couplings, the pipe couplings may thus be implemented as screw connections or, alternatively, even as hose clamp connections. Because of the more elegant and therefore less susceptible external shape, the screw connection is certainly the preferred achievement of the object. However, the hose clamp connection is also of interest because of the simpler mounting and dismounting. It is also to be ensured here, however, that the projecting parts of the hose clamp connection do not result in damage to pipeline or bracket or become a danger to the miners, who often travel along the pipeline under cramped conditions. Therefore, according to a further teaching of the present invention, the hose clamp connection has a form fitting twist lock to connect pipe coupling and conical rings. In this way, twisting of the hose clamp is prevented, so that in the event of axial displacement of the pipeline on the bracket, no projecting parts scratch on the friction surface.

The pipe coupling may have pins as the twist lock, each of which engages in a corresponding recess on the front face of each conical ring. Alternatively, it is also possible for the pipe coupling to be provided with an external axially projecting tab as the twist lock, which engages in corresponding recesses on the outside of the conical rings. To avoid loss of unattached individual parts, such a tab is preferably welded to the pipe coupling hose clamp.

The device according to the present invention is suitable for pipe connections of pipes having a nominal diameter of 60 to 120 mm. High-pressure pipelines having such large nominal diameters are particularly used in underground mining in North America, the dimensions of the longwall timbering and walling being dimensioned correspondingly large because of the geological situation due to the greater coal thickness than in Europe.

The present invention will be explained in greater detail in the following on the basis of a drawing which merely illustrates exemplary embodiments.

BRIEF DESCRIPTION OF THE DRAWINGS

FIG. 1 shows a first exemplary embodiment of the device according to the present invention in a side view, FIG. 2 shows the object from FIG. 1 in the direction of the arrow II-II, FIG. 3 shows a second exemplary embodiment of the device according to the present invention in a side view, FIG. 4 shows the object from FIG. 3 in the direction of the arrow IV-IV, FIG. 5 shows a further exemplary embodiment of the device according to the present invention in a side view, FIG. 5A shows a detail illustration of the twist lock in horizontal section along the line VIA-VIA in FIG. 5, FIG. 6 shows the object from FIG. 5 in the direction of the arrow VI-VI, and FIG. 7 schematically shows the usage location of the device according to the present invention on a longwall conveyor.

DESCRIPTION OF THE PREFERRED EMBODIMENTS

Figure 7:
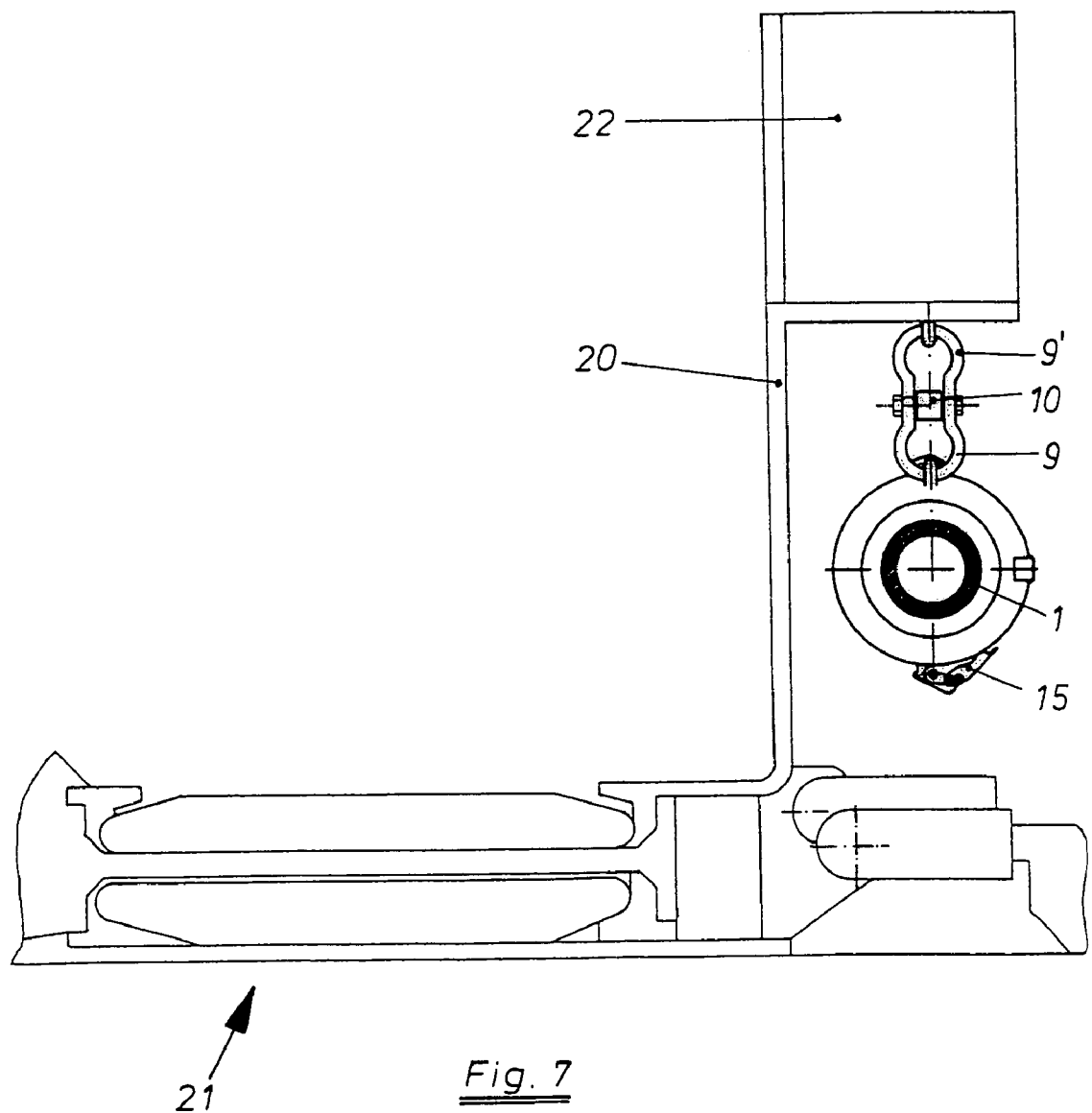

FIGS. 1 and 2 first show a first embodiment of the device according to the present invention in the finished mounted position. In this case, two pipe ends 1 and 2 are connected to one another using a pipe coupling 3, implemented in this exemplary embodiment as a screw coupling. Both pipe ends 1, 2 are reinforced according to the present invention using an essentially conical ring 4, 5, whose external surface expands from the external diameter of the pipe up to the external diameter of the pipe coupling 3. After the pipe ends 1 and 2 are screwed together, the conical rings 4 and 5 are pushed onto the pipe coupling 3 and fixed there using screws 6. In order that the screw connection may not come loose in the pipe coupling 3 illustrated, of which only the union nut may be seen, a cotter pin 7 connects the union nut (not shown in greater detail) and the coupling parts lying beneath it.

To attach the device according to the present invention to the longwall conveyor, the conical rings 4 and 5 each have a welded-on eye 8, in which a shackle 9 is located, and an additional welded-on eye 8' positioned diametrically opposite welded on eye 8. The shackles 9 are positioned on the ends of a clip 10 so they are rotatable and attached using threaded bolts 11. A centrally positioned shackle 9' ensures the suspension of the clip 10. This preferred embodiment of the suspension has the advantage that pipe and clip 10 may be displaced in relation to one another like a parallelogram in the axial direction by the four pivot bearings. In this way, the length changes of the pipeline arising during the shifting movements may be absorbed reliably. In particular, the sensitive pipe coupling 3 is protected laterally by the conical rings 4 and 5 and also not loaded by the suspension.

FIGS. 3 through 6 represent two alternative embodiments of the device according to the present invention, in which the pipe couplings are implemented as a hose clamp connection. In this embodiment, it is important that the projecting parts of the hose clamps may not protrude laterally, in order to reliably prevent damage. For this purpose, a twist lock is provided, which is described in greater detail in the following.

In the embodiment shown in FIGS. 3 and 4, the construction parts already described in FIGS. 1 and 2 are provided with identical reference numbers. The conical rings 4' and 5' were modified to achieve a twist lock of the pipe coupling 3'. The pipe hose clamp, which is known per se, comprises two hose clamp halves 12 and 13 in this case, which are connected to one another using a threaded bolt 14 so they are rotatable. On its open side, the hose clamp may be closed using a quick acting closure 15, whose individual parts are not shown in greater detail. In order that the joint and also the quick acting closure 15 only extend upward and/or downward, the hose clamp half 13 is provided with two pins 16, which engage in corresponding recesses 17 of the conical rings 4' and 5' and ensure a twist lock.

Another type of twist lock is implemented in the object of FIGS. 5 and 6, a pipe coupling 3" is illustrated here, in which a hose clamp half 13 is provided with a tab 18 which engages in corresponding recesses 19 of the conical rings 4" and 5".

The implementation of the tab 18 may be seen clearly in the top view shown in FIG. 5A.

Finally, FIG. 7 shows the usage location of the device according to the present invention. It is located on the bracket 20 of a longwall conveyor 21 below the cable channel 22 provided. Because of the tight spatial conditions, unavoidable contacts occur between the pipe connections, pipes, and the bracket 20, as already noted. Because of the special embodiment of the device according to the present invention, however, these no longer result in damage or even destruction of the pipeline.

The invention claimed is:

1. A device for connecting a first end of a first pipe and a second end of a second pipe, the first and second pipes forming a high-pressure pipeline for use in longwalls of underground mining, the device comprising:
   a removable pipe coupling for tension-proof and tight connection of the two pipe ends tailored to one another;
   a first essentially conical ring positioned at the first end of the first pipe thereby reinforcing the first end of the first pipe; and
   a second essentially conical ring positioned at the second end of the second pipe thereby reinforcing the second end of the second pipe,
   wherein an outer surface of each of the conical rings expands from approximately the external diameter of the respective pipe up to approximately the external diameter of the pipe coupling and each conical ring has at least a first radially projecting eye adapted for suspending the high pressure pipelines.

2. The device according claim 1, wherein the conical rings are pushed onto the pipe ends before the pipe coupling parts are welded on and are pushed axially up to the pipe coupling and fixed there after the pipe coupling is mounted.

3. The device according to claim 2, wherein the conical rings are fixed in the mounted position on the pipe ends using screws.

4. The device according to claim 1, wherein each conical ring has at least one further radially projecting eye, wherein the radially projecting eye is diametrically opposite the first radially projecting eye.

5. The device according to claim 4, wherein a centrally positioned clip is provided for suspension, wherein rotatable shackles are positioned on ends of the clip, wherein the shackles are mounted in the eyes.

6. The device according to claim 5, wherein the spacing of the shackles essentially corresponds to the spacing of the eyes.

7. The device according to claim 4, wherein the pipe coupling has a form fitting twist lock to connect the pipe coupling and the conical rings.

8. The device according to claim 1, wherein the pipe coupling provides a screw connection.

9. The device according to claim 1, wherein the pipe coupling provides a hose clamp connection.

10. The device according to claim 9, wherein the hose clamp connection has a formfitting twist lock to connect the pipe coupling and the conical rings.

11. The device according to claim 10, wherein the twist lock includes pins, wherein the pins each engage in a corresponding recess on a front face of each conical ring.

12. The device according to claim 10, wherein the twist lock includes an external, axially projecting tab, wherein the tab engages in corresponding recesses on the outside of the conical rings.

13. The device according to claim 12, wherein the tab is welded to the pipe coupling hose clamp.

14. The device according to claim 1, wherein the pipe coupling is configured to connect pipes having a nominal diameter of 60 mm to 120 mm.

15. The device according to claim 1, wherein the pipe coupling has a form fitting twist lock to connect the pipe coupling and the conical rings.

16. The device according to claim 1, wherein the pipe coupling is configured to connect pipes having a nominal diameter of 100 mm.

* * * * *